(12) United States Patent
Tanami et al.

(10) Patent No.: US 11,966,466 B2
(45) Date of Patent: Apr. 23, 2024

(54) UNIFIED WORKLOAD RUNTIME PROTECTION

(71) Applicant: Check Point Serverless Security Ltd., Tel Aviv (IL)

(72) Inventors: Ohad Tanami, Jerusalem (IL); Itay Harush, Jerusalem (IL); Piyush Anand Deshpande, Pune (IN); Devdatta Krishna Deshpande, Pune (IN)

(73) Assignee: Check Point Serverless Security Ltd., Tel Aviv (IL)

( * ) Notice: Subject to any disclaimer, the term of this patent is extended or adjusted under 35 U.S.C. 154(b) by 348 days.

(21) Appl. No.: 17/571,832

(22) Filed: Jan. 10, 2022

(65) Prior Publication Data

US 2023/0222211 A1 Jul. 13, 2023

(51) Int. Cl.
*G06F 21/54* (2013.01)
*G06F 9/50* (2006.01)
*G06F 21/55* (2013.01)
*G06F 21/60* (2013.01)

(52) U.S. Cl.
CPC .......... *G06F 21/54* (2013.01); *G06F 9/5016* (2013.01); *G06F 9/5038* (2013.01); *G06F 9/505* (2013.01); *G06F 21/554* (2013.01); *G06F 21/604* (2013.01)

(58) Field of Classification Search
CPC ...... G06F 21/54; G06F 9/5016; G06F 9/5038; G06F 9/505; G06F 21/554; G06F 21/604; G06F 21/52; G06F 21/53; G06F 21/566
See application file for complete search history.

(56) References Cited

U.S. PATENT DOCUMENTS

| | | | | |
|---|---|---|---|---|
| 11,734,418 B1 * | 8/2023 | Epstein | ................... | G06F 21/53 726/22 |
| 11,792,216 B2 * | 10/2023 | Huang | ................ | H04L 63/1425 726/22 |
| 2019/0020665 A1 * | 1/2019 | Surcouf | ................ | H04L 9/3236 |
| 2019/0156023 A1 * | 5/2019 | Gerebe | .................. | G06F 21/51 |
| 2019/0190931 A1 * | 6/2019 | Levin | ...................... | H04L 63/20 |
| 2020/0133789 A1 * | 4/2020 | Natanzon | .............. | G06F 16/128 |
| 2020/0218798 A1 * | 7/2020 | Kosaka | ................... | G06F 9/455 |
| 2021/0014303 A1 * | 1/2021 | Guim Bernat | ...... | H04L 41/5051 |
| 2021/0097169 A1 * | 4/2021 | Nunez Mencias | .... | G06F 21/602 |
| 2021/0303322 A1 * | 9/2021 | Babol | ................. | G06F 9/45529 |
| 2021/0357238 A1 * | 11/2021 | Kirmse | ............... | G06F 9/45558 |

* cited by examiner

Primary Examiner — Jeremy S Duffield
Assistant Examiner — Nicholas Joseph Diluzio
(74) Attorney, Agent, or Firm — Renner, Otto, Boisselle & Sklar, LLP

(57) ABSTRACT

A protection system is provided for delivering runtime security to a task including a workload container. The protection system uses a sidecar to limit access of the workload container to a standard library of the operating system running the workload container by modifying the task so that the sidecar is executed before the workload container. The sidecar places a guard loader into a shared volume and binds the workload container, such that calls to the workload container are passed to an agent binary. The agent binary compares requested calls from the workload container to a policy to approve and/or deny the requested calls. If the requested call is approved, then the requested call is passed to the standard library.

20 Claims, 4 Drawing Sheets

UNIFIED WORKLOAD RUNTIME PROTECTION

TECHNICAL FIELD

The present disclosure relates generally to a software platform and more particularly to securing a software platform implementing micro-services.

BACKGROUND

Modern cloud computing platforms such as Amazon web services (AWS), Microsoft Azure, and Google cloud provide their customers many ways to simplify their software development and deployment process. The use of containers and lambda functions is rapidly becoming the preferred options for developing and deploying applications in the cloud.

Containers are an example of an approach for implementing operating-system-level virtualization. They are self-contained execution environments that can have their own isolated CPU, memory, input/output (I/O), and network resources, and may share a kernel of a host operating system. Containers can be isolated from one other (physical and/or virtual servers). Containers can be easier to build and configure than virtual machines, and because containers can be decoupled from their underlying infrastructure and from host file systems, containers can be highly portable across various clouds and operating system distributions. Enterprises can rapidly develop software for distributed applications, services, and microservices in private networks, public clouds, or both (e.g., hybrid clouds or multi-clouds) by running them in containers in development and test environments.

In some implementations (e.g., Docker) containers pack an application or specific functionality with its dependencies and configuration files in a virtual container. This enables the application to run in a variety of locations (e.g., locally, private cloud or public cloud). Container orchestration engines (e.g., ECS and Kubernetes) manage running of containers.

SUMMARY

The present disclosure provides a protection system for providing runtime security to a task including a workload container by using a sidecar to limit access of the workload container to a standard library of the operating system running the workload container.

According to one embodiment, the protection system provides runtime protection for a compute instance using monitoring abilities and enforcement abilities. The monitoring abilities include tracking operations, learning and defining activities, and creating a processes whitelist based on the learning and defining of the activities. The enforcement abilities include alerting and/or blocking of malicious activities, and enforcing whitelist processes and alerting/blocking non-white listed operations.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
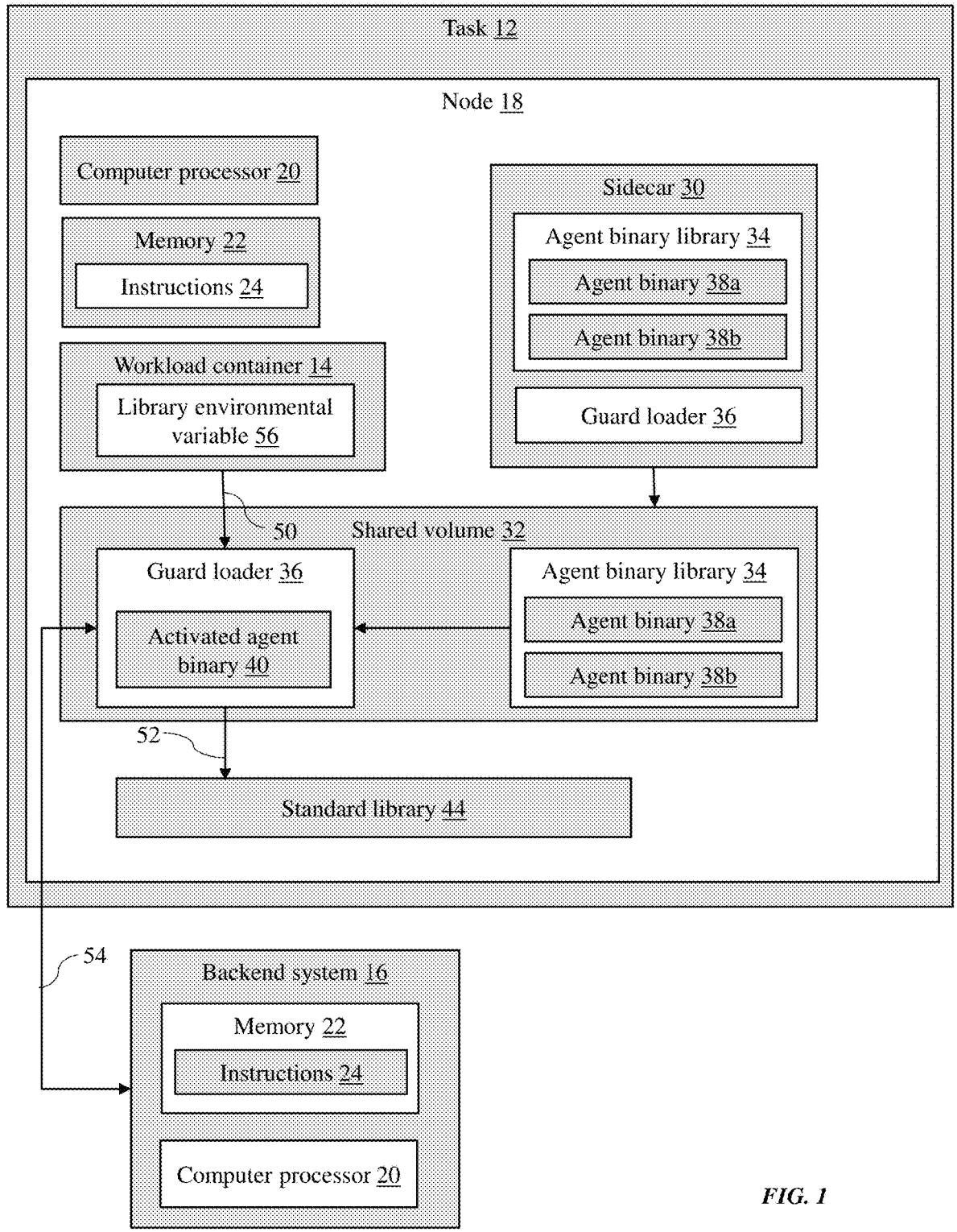
FIG. 1 is a block diagram of an exemplary embodiment of a protection system for a managed task.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

As described above, containers play an increasingly important role in modern networks. Containers can be used to modernize a data center by packaging existing applications into containers to improve utilization of computing resources and to reduce costs.

Orchestration engines provide the ability to create a cluster. Clusters (e.g., an ECS Cluster) include one or more machines (e.g., virtual and/or physical) where containers are run (also referred to as executed). Different orchestration engines use different objects for deploying containers. These different objects can generally be described as deployment units (e.g., Kubernetes POD and ECS task) and will be referred to herein as tasks and workloads.

Each task contains one or more containers and may also include environment variables, memory, and CPU requirements, and other configurations for the task. Tasks may be either managed or unmanaged. A task 12 may be performed using one or more nodes 18. Each node 18 may be a virtual machine (e.g., a virtual machine executed by a computer device) or a physical machine (i.e., a computer, server, etc.).

The protection system described herein may cover both managed and unmanaged workloads. For example, the protection system may use a protection agent to perform the monitoring and enforcement. The protection agent may be a part of the task/container, or a part of the instance. For example, for unmanaged workloads, the user may create nodes (also referred to as cluster nodes) and the user may have privileged permissions on these created nodes. This may allow a protection agent to be created on the nodes (i.e., on the host operating system) by adding a kernel module to monitor all containers running on the node.

For example, a user may define the container itself and its resources, which containers should run and when, the number of instances of each container, etc. For managed tasks, the system (e.g., Amazon web services (AWS)) may control execution of the containers and users may not have any access to the machines. For managed workloads, the user does not have access to the cluster host machine and cannot install agents on the nodes. For this reason, a protection agent is instead included as a part of the workload itself. That is, for managed workloads, the protection agent (also referred to as a security agent) runs on the container and is built and linked to the appropriate operating system (OS) used by the container, due to per operating system dependencies and operating system low level components. For example, in managed tasks, the protection agent is typically not able to scan customer images to identify container base image operating system, does not have a privilege permission on cluster nodes, and does not have read and update permissions on customer tasks.

According to a general embodiment, a protection system is provided for delivering runtime security to a task including a workload container. The protection system uses a sidecar (also referred to as a protection agent) to limit access of the workload container to a standard library of the operating system running the workload container by modifying the task so that the sidecar is executed before the workload container. The sidecar places a guard loader into a shared volume and binds the workload container, such that calls from the workload container are passed to an agent binary associated with the operating system of the workload container (if the operating system is supported) or a standard library (if the operating system is not supported). For supported operating systems, the agent binary compares requested calls from the workload container to a policy to approve and/or deny the requested calls. If the requested call is approved, then the requested call is passed to the standard library.

Turning to FIG. 1, an exemplary embodiment of a protection system 10 for providing runtime security to a task 12 including a workload container 14 is shown. The protection system 10 includes a backend system 16 and at least one node 18. The backend system 16 and the node 18 both include a computer processor 20, non-transitory computer readable medium (also referred to as a memory) 22, and computer executable instructions 24. The node 18 executes the task 12. The backend system 16 modifies the task 12 to include a sidecar 30 (i.e., an additional container). The backend system 16 also modifies the task 12 to include a shared volume 32. The shared volume 32 is memory accessible to the sidecar 30 and the workload container 14. The backend system 16 additionally modifies the task 12 such that the sidecar 30 is executed before the workload container 14.

The sidecar 30 that is added to the task 12 includes an agent binary library 34 and a guard loader 36. The agent binary library 34 includes agent binaries 38 associated with multiple operating systems and including agent hooks. That is, each of the agent binaries 38 is associated with one or more target operating systems of the multiple operating systems. The guard loader 36 is executable on all of the multiple operating systems and is configured to identify an operating system of the workload container 14. That is, the guard loader 36 is configured to identify an operating system of the node 18 executing the workload container 14. For example, the guard loader 36 may identify the operating system of the workload container 14 based on a presence or lack of files accessible by the guard loader 36.

When the node 18 executes the operations of the sidecar 30 (e.g., when the task starts), the sidecar 30 loads the guard loader 36 into the shared volume 32. The guard loader 36 identifies the operating system of the workload container 14. The sidecar 30 also copies the agent binary library 34 into the shared volume 32. For example, the agent binary library 34 may be a part of or separate from the guard loader 36. The sidecar 30 activates in the shared volume 32 the agent binary associated with the identified operating system of the workload container 14 from the agent binary library 34 as an activated agent binary 40. The sidecar 30 also binds loader hooks to the activated agent binary 40, such that the workload container 14 requesting a process (also referred to as an operation) associated with one of the loader hooks results in a call to the activated agent binary 40 for the requested process. As described in further detail below, if the request for the process (also referred to as a call) is approved, then the request may be passed to the standard library 44.

The node 18 executes operations of the workload container 14, such that the activated agent binary 40 receives calls from the workload container 14 and each of the received calls includes a requested process 50. Upon the activated agent binary 40 receiving a call including a requested process 50, the activated agent binary 40 compares the requested process 50 to a policy 54 to determine if the requested process 50 is approved or denied. When the requested process 50 is approved, the activated agent binary 40 passes the requested process 50 to an agent hook 52 identified as being associated with the requested process 50. For example, upon receiving the requested process 50, the activated agent binary 40 may send the agent hook 52 associated with the requested process 50. Conversely, when the requested process 50 is denied, the activated agent binary 40 does not pass along the requested process 50 to an agent hook 52 identified by the activated binary 40 as being associated with the requested process 50.

As described above, the protection system 10 uses a sidecar 30 (i.e., a type of container) that is added to the task 12. The agent binaries 38 of the sidecar 30 are compiled against target operating systems that the agent binary 38 will be running on. Because there are different possible operating systems that the workload container 14 and sidecar 30 may be run on, the sidecar 30 includes different agent binaries associated with different operating systems (e.g., each of the different agent binaries 38a, 38b stored in the agent binary library 34.

By detecting the operating system of the workload container 14 via the guard loader 36, runtime security may be provided to the user without requiring the user to identify and provide an operating system of the workload container 14. Similarly, the protection system does not require any privileges to provide runtime protection other than editing the task 12.

For example, the operating system may be a version of Linux such as Ubuntu, Redhat, Alpine, etc. The agent binaries may be precompiled binaries specific to a particular operating system (e.g., specific to a particular Linux distribution).

In one embodiment, the task 12 includes multiple different nodes 18 and each of the nodes may be embodied as a separate virtual machine or physical electronic machine. The workload container 14 may also comprise multiple containers (e.g., multiple different containers).

The guard loader 36 of the sidecar 30 may be a low-level loader. For example, the guard loader 36 may be a small piece of native C code, with no dependencies except from the basic libc API that is available in all Linux distributions. The guard loader 36 may be built by a native GCC compiler to produce a binary file (e.g., ELF file) that is executable on all Linux based Operating Systems.

In one embodiment, the guard loader 36 includes the following components: operating system identifier, low level hook functions, agent binary dynamic loader, and LD_Preload hooks binder. The operating system identifier may be responsible for identifying the container operating system (i.e., the operating system of the workload container 14) based on various files and indicators that the guard loader 36 can access on its execution. The low-level hook functions may be a set of exported functions (e.g., with appropriate signatures) that will be the LD_Preload hooks. The LD_Preload hooks binder may be responsible for resolving the C standard library (libc) hooks target functions, resolving operating system binary target functions, and binding loader hooks to the guard loader (e.g., assuming the operating system is supported).

The agent binary dynamic loader may receive as a parameter the operating system identified by the operating system identifier, and both dynamically loads the appropriate agent binary and initializes the workload container with libc hooks resolved by the binder. The C standard library (libc) is the standard library for the C programming language. The C standard library provides macros, type definitions and functions for tasks such as string handling, mathematical computations, input/output processing, memory management, and several other operating system services.

As described above, the backend system 16 reads task definitions and updates tasks 12 to enable protection by adding a shared volume 32 to the task 12. The shared volume 32 is visible to (e.g., accessible for read and/or write access) the sidecar 30 and the workload container(s) 14. For example, the shared volume 32 may be allocated memory that is accessible by all containers on a same task 12. The shared volume 32 is memory used to link the sidecar 30 with each of the workload containers 14.

As described above, the updating of the task 12 by the backend system 16 may also include adding the sidecar 30 to the task 12 and defining the sidecar 30 as the first container run in the task initialization flow. This updating may be performed by modifying the environmental variables of the workload container 14 (e.g., defined in the task definition), such that the workload container 14 executes the guard loader 36 upon running. For example, the library environmental variable 56 (e.g., LD_PRELOAD) may be created/updated on the workload container 14 to point to the guard loader 36 stored in the shared volume 32.

The sidecar 30 is another container located within the task 12. When the sidecar 30 is executed, the sidecar 30 copies the guard loader 36 to the shared volume 32 and copies the agent binary library 34 (including agent binaries 38) to the shared volume 32. As described above, the guard loader 36 dynamically identifies the operating system being run by the workload container 14 and loads the agent binary 38 from the agent binary library 34 that corresponds to the identified operating system of the workload container 14.

In one embodiment, the update of the task 12 by the backend system 16 results in the following flow order of task/workload execution: guard loader 36 is loaded from the shared volume 32 followed by execution of the workload container(s) 14. Upon loading, the guard loader 36 resolves hook function addresses (e.g., libc hook function addresses) and identifies the operating system of the workload container 14. If the operating system is supported (i.e., if the agent binary library 34 includes an agent binary 38 associated with the identified operating system), the guard loader 36 loads the appropriate agent binary 38 as an activated agent binary 40, initializes the activated agent binary 40 (e.g., using libc hook addresses), and binds loader hooks to the loaded agent binary hooks. For example, the guard loader may implement hooks to various low level libc API (e.g., open file, create new process, create network socket, open an API against the operating system etc.).

Figure 2:
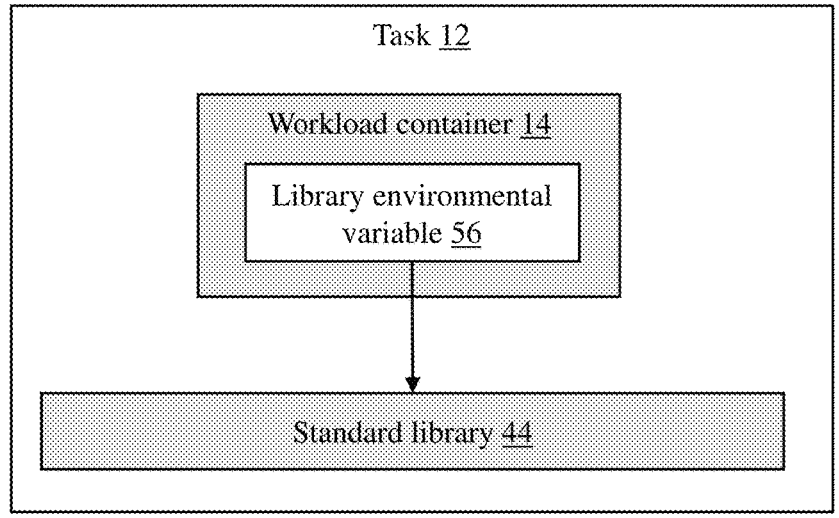
FIG. 2 is a block diagram of an exemplary embodiment of the protection system for a managed task performed on an unsupported operating system.

As shown in the exemplary embodiment of FIG. 2, if the operating system is not supported (i.e., there is not an agent binary 38 stored in the agent library 34 that is associated with the identified operating system), then the loader hooks are not bound to the loaded agent binary hooks and the hook functions (e.g., libc functions) function normally. If the operating system is not supported, the protection system 10 may issue a notification that the operating system is not supported. For supported operating systems, this initialization process results in the workload container 14 operating with guard agent hooks activated.

LD_PRELOAD may be an optional library environmental variable 56 containing one or more paths to shared libraries, or shared objects, that the guard loader 36 may load into the workload container 14 before any other shared library (e.g., before the C runtime library). LD_preload may define the hooks (e.g., for opening files) so that each time there is an environmental variable pointing to an object, it will first load the activated agent binary 40. As described above, the activated agent binary 40 may then determine if the requested operation (i.e., the requested process) is permitted. If the operation is permitted, then the appropriate (e.g., libc) hook is called.

Figure 3:
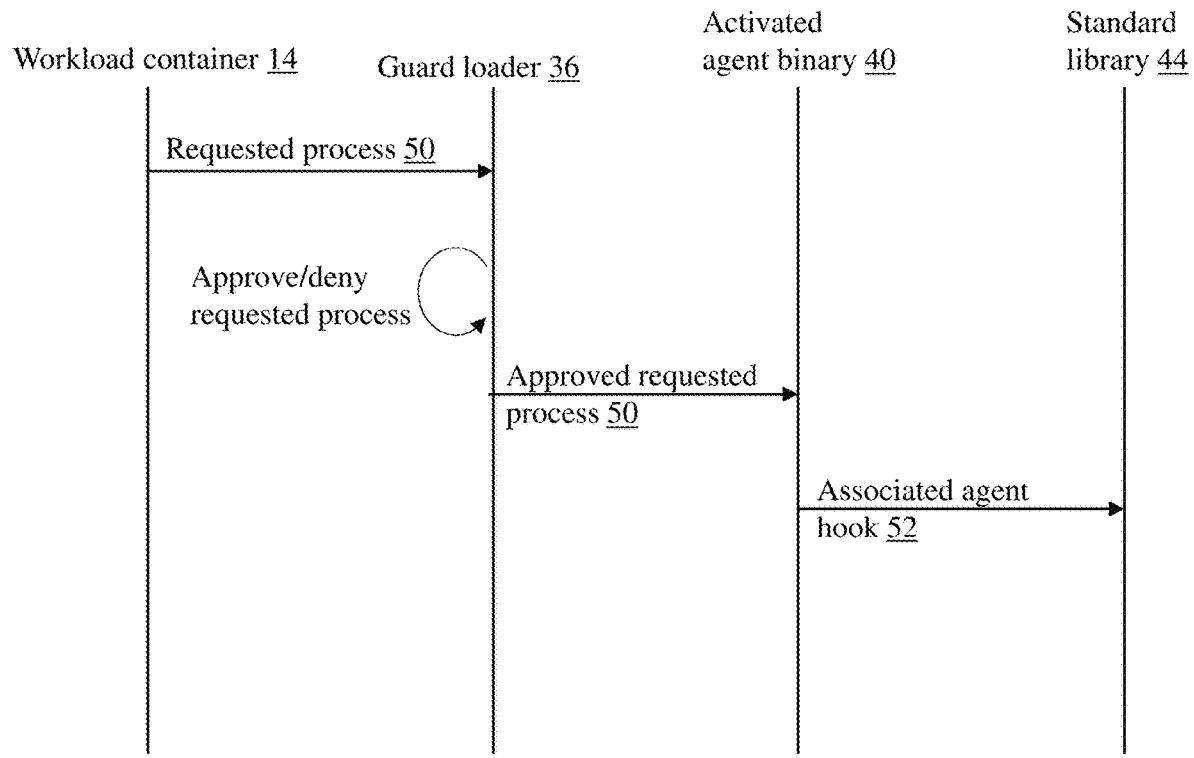
FIG. 3 is a ladder diagram depicting an exemplary operational flow of the protection system.

In the exemplary embodiment shown in FIG. 3, when the guard loader 36 receives a request for a process 50 (e.g., a libc function), the guard loader 36 passes the request to the activated agent binary 40 and the activated agent binary 40 compares the requested process to the policy 54. The policy 54 may be used to provide runtime security (also referred to as workload runtime protection) on the workload container 14 in an unmanaged system by approving operations requested by the workload container 14 (i.e., that the workload container is attempting to perform).

Figure 4:
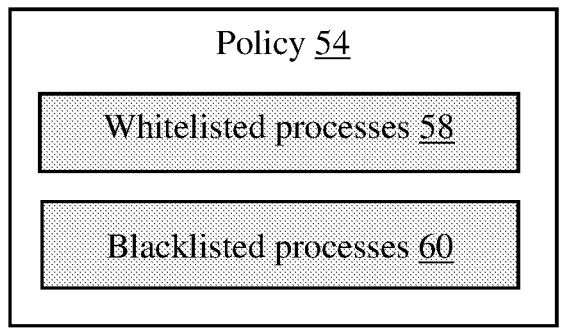
FIG. 4 is a block diagram of an exemplary embodiment of a policy.

As shown in FIG. 4, the policy 54 may include whitelisted processes 58, such that a requested process 50 identified by the policy 54 as a whitelisted process is approved by the activated agent binary 40. The activated agent binary 40 may deny a requested process 50 when the requested process 50 is not identified as a whitelisted process. For example, the activated agent binary 40 may only approve whitelisted processes.

The policy 54 may alternatively or additionally include blacklisted processes 60, such that a requested process 50 identified by the policy 54 as a blacklisted process is denied by the activated agent binary 40. The activated agent binary 40 may approve a requested process 50 when the requested process is not identified as a blacklisted process. For example, the activated agent binary 40 may only reject blacklisted processes.

As an example, if the requested process 50 is whitelisted in the policy 54 (i.e., identified as approved), then a requested process comprising a libc request may be passed onto libc. Similarly, if the requested process is blacklisted (i.e., identified as not approved), then a requested process comprising a libc request may not passed onto libc.

The policy 54 may be provided by the backend system 16. The policy 54 may be applied at the account level, such that the policy applies to all tasks 12 in the account. Alternatively, the policy may be applied at the task level, such that the policy applies only to a single task. The policy 54 may be stored in the backend system 16, within the workload container 14, or in another storage location (e.g., a blob storage for storing files that sits on a user's account).

Figure 5:
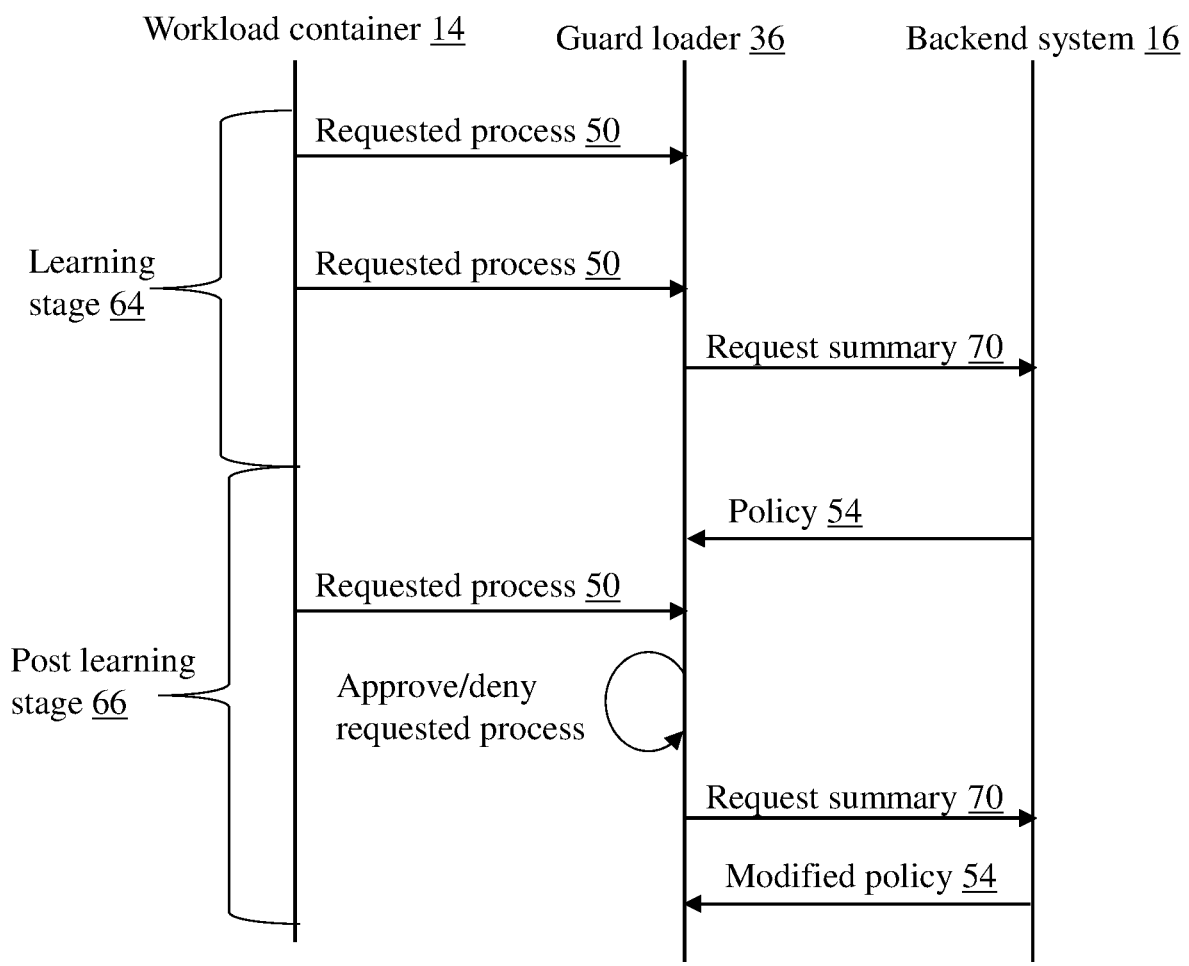
FIG. 5 is a ladder diagram depicting an exemplary operational flow of the protection system modifying a policy.

As shown in FIG. 5, the policy 54 may be created and/or updated by the backend system 16 based on the behavior of the workload container 14. A task, account, or container may have a learning stage 64 during which all processes (also referred to as operations) performed by the workload container 14 are reported to the backend system 16. That is, during the learning stage 64, the activated agent binary 40 may approve and notify the backend system 16 of all processes 50 requested by the workload container 14. At the end of the learning stage 64, the backend system 16 may generate the policy 54 based on the processes 50 requested by the workload container 14 during the learning stage 64. For example, during the post learning stage 66 the backend system 16 may build a policy 54 that defines the operations that are whitelisted. As an example, all processes requested by the workload container 14 during the learning stage 64 may be identified in the policy 54 as whitelisted operations and all processes not requested during the learning stage 64 may be identified as blacklisted processes.

As shown in FIG. 5, the activated agent binary 40 may send the backend system 16 request summaries 70 including the processes 50 requested by the workload container 14. The backend system 16 may modify the policy 54 based on the request summaries 70.

In one embodiment, the policy 54 may identify a requested process as prohibited or approved depending on various parameters. For example, the policy 54 may specify that a particular type of requested process is prohibited or approved (e.g., no opening of ports). Similarly, the policy 54 may alternatively or additionally specify that a requested process is approved or prohibited based on one or more of the resources that the operation is performed on, the process that performs the operation, or the particular operation that is performed against the resource.

As described above, the policy 54 may contain at least one of prohibited processes or allowed processes. The policy 54 may also identify the remedy to take when a prohibited process is requested. For example, the activated agent binary 40 may report the prohibited process being requested (e.g., by issuing a notification) with or without blocking performance of the prohibited process being requested.

The activated agent binary 40 may perform a check to determine when changes have been made to the policy 54 (e.g., by the backend system 16) since the last time that the policy 54 was received. For example, the activated agent binary 40 may perform a check every few minutes, hours, or days to determine whether changes have been made to the policy 54. If the policy 54 has changed, then the activated agent binary 40 may obtain a new version of the policy. For example, the activated agent binary 40 may download the entire policy or a subset of the policy, such as the portions of the policy that have changed.

Figure 6:
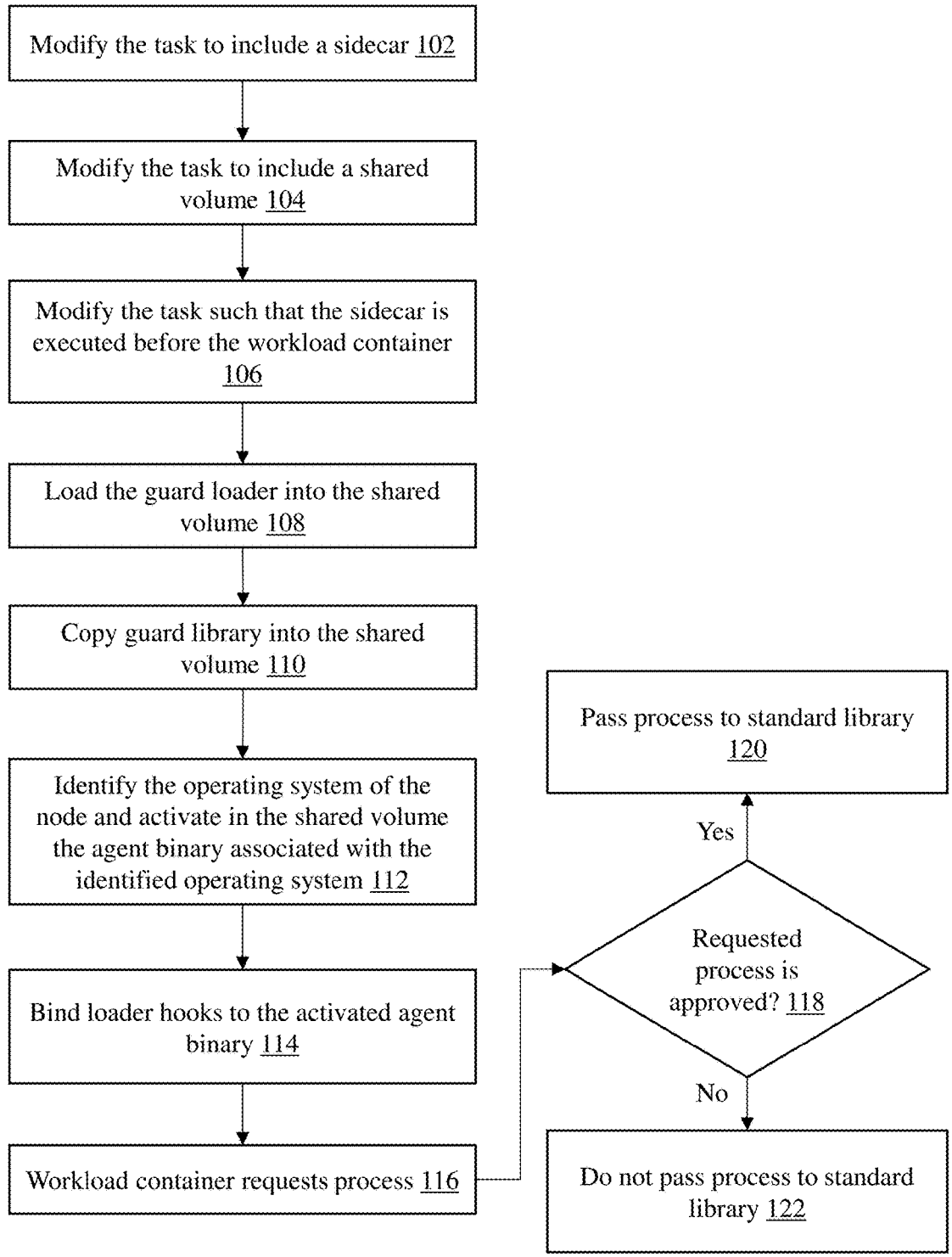
FIG. 6 is a flow diagram of an exemplary embodiment of a computer executed method for providing runtime security to a task including a workload container using a backend system.

In FIG. 6, an exemplary embodiment of a computer executed method 100 for providing runtime security to a task including a workload container 14 using a backend system 16 is shown. In step 102, the task 12 is modified by the backend system 16 to include a sidecar 30 as a container. In step 104, the task 12 is further modified using the backend system 16 to include a shared volume 32 accessible to the sidecar 30 and the workload container 14. In step 106, the task 12 is also modified using the backend system such that the sidecar 30 is executed before the workload container 14.

In step 108, the guard loader 36 is loaded into the shared volume 32 using the sidecar 30. In step 110, the sidecar copies the agent binaries into the shared volume. In step 112, the guard loader 36 is executed by the node 18 to identify the operating system of the workload container 14 and to activate in the shared volume the activated agent binary 40. In step 114, the activated agent binary 40 binds loader hooks to the activated agent binary 40, such that the workload container 14 requesting a process 50 associated with one of the loader hooks results in a call to the activated agent binary 40 for the requested process.

In step 116, the node 18 executes operations of the workload container 14, such that the activated agent binary 40 receives calls from the workload container 14 and each of the received calls includes requested process 50. In determination step 118, upon receiving a call including a requested process, the activated agent binary 40 compares the requested process to the policy 54 to determine if the requested process is approved or denied. When the requested process is approved, processing progresses to step 120. In step 120, the requested process is passed to an agent hook identified by the activated agent binary as being associated with the requested process. When the requested process is denied, processing progresses to step 122. In step 122, the requested process is not passed to an agent hook.

The computer processor 20 (also referred to as circuitry) of the node(s) 18 and the backend system 16 may have various implementations. For example, the computer processor 20 may include any suitable device, such as a processor (e.g., CPU), programmable circuit, integrated circuit, memory and I/O circuits, an application specific integrated circuit, microcontroller, complex programmable logic device, other programmable circuits, or the like. The computer processor 20 may also include memory, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the computer processor 20. The computer processor 20 may be communicatively coupled to the computer readable medium and network interface through a system bus, mother board, or using any other suitable structure known in the art.

The computer readable medium (memory) 22 of the node(s) 18 and the backend system 16 may be, for example, one or more of a buffer, a flash memory, a hard drive, a removable media, a volatile memory, a non-volatile memory, a random-access memory (RAM), or other suitable device. In a typical arrangement, the computer readable medium 22 may include a non-volatile memory for long term data storage and a volatile memory that functions as system memory for the processor 20. The computer readable medium 22 may exchange data with the circuitry over a data bus. Accompanying control lines and an address bus between the computer readable medium 22 and the circuitry also may be present. The computer readable medium 22 is considered a non-transitory computer readable medium.

The node(s) 18 and the backend system 16 may include a communication interface (also referred to as a network interface) comprising a wireless network adaptor, an Ethernet network card, or any suitable device that provides an interface to a network. The communication interface may be communicatively coupled to the computer readable medium, such that the communication interface is able to send data stored on the computer readable medium across the network and store received data on the computer readable medium 22. The communication interface may also be communicatively coupled to the circuitry such that the circuitry is able to control operation of the communication interface. The communication interface, computer readable medium, and circuitry may be communicatively coupled through a system bus, mother board, or using any other suitable manner as will be understood by one of ordinary skill in the art.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A protection system for providing runtime security to a task including a workload container, the protection system comprising:
   a backend system including a computer processor and a non-transitory computer readable medium storing computer executable instructions, wherein in response to executing the computer executable instructions the computer processor of the backend system is configured to:
   modify the task to include a sidecar as a container;
   modify the task to include a shared volume comprising memory accessible to the sidecar and the workload container;
   modify the task such that the sidecar is executed before the workload container, wherein the sidecar includes:
   agent binaries associated with multiple operating systems and including agent hooks, wherein each of the agent binaries is associated with one or more target operating systems of the multiple operating systems; and
   a guard loader executable on all of the multiple operating systems and configured to identify an operating system of the workload container; and
   a node including a computer processor and a non-transitory computer readable medium storing computer executable instructions, wherein in response to executing the computer executable instructions the computer processor of the node is configured to:
   execute operations of the sidecar including:
   loading the guard loader into the shared volume; and
   copying the agent binaries into the shared volume as an agent binary library;
   execute the guard loader loaded into the shared volume to identify the operating system of the workload container;
   activate in the shared volume as an activated agent binary the agent binary associated with the identified operating system of the workload container;
   bind loader hooks to the activated agent binary, such that the workload container requesting a process associated with one of the loader hooks results in a call to the activated agent binary for the requested process; and
   execute operations of the workload container, such that the activated agent binary receives the call from the workload container and the received call includes the requested process;
   wherein upon receiving the call including the requested process, the computer processor of the node is configured to execute the activated agent binary by:
   comparing the requested process to a policy to determine if the requested process is approved or denied;
   when the requested process is approved, passing the requested process to one of the agent hooks identified by the activated agent binary as being associated with the requested process; and
   when the requested process is denied, not passing the requested process to one of the agent hooks identified by the activated binary as being associated with the requested process.

2. The protection system of claim 1, wherein the policy includes whitelisted processes, such that any requested process identified by the policy as a whitelisted process is approved by the activated agent binary.

3. The protection system of claim 2, wherein the activated agent binary is configured to deny the requested process when the requested process is not identified as a whitelisted process.

4. The protection system of claim 1 wherein the policy includes blacklisted processes, such that any requested process identified by the policy as a blacklisted process is denied by the activated agent binary.

5. The protection system of claim 4, wherein the activated agent binary is configured to approve the requested process when the requested process is not identified as a blacklisted process.

6. The protection system of claim 1, wherein the policy is provided to the activated agent binary by the backend system.

7. The protection system of claim 6, wherein:
   during a learning stage, the activated agent binary is configured to approve and to notify the backend system of all processes requested by the workload container; and
   at the end of the learning stage, the backend system is configured to generate the policy based on the processes requested by the workload container during the learning stage.

8. The protection system of claim 6, wherein:
   the activated agent binary is configured to send the backend system request summaries comprising the processes requested by the workload container; and
   the backend system is further configured to modify the policy based on the request summaries.

9. The protection system of claim 1, wherein the guard loader is configured to identify the operating system of the workload container based on a presence or lack of files accessible by the guard loader.

10. The protection system of claim 1, wherein the backend system is configured to modify the task, such that the sidecar is a first container executed in an initialization flow of the task.

11. A computer executed method for providing runtime security to a task including a workload container executed by a computer processor of a node using a backend system including a computer processor, the method comprising:
modifying the task to include a sidecar as a container using the backend system;
modifying the task using the backend system to include a shared volume comprising memory accessible to the sidecar and the workload container;
modifying the task using the backend system such that the sidecar is executed before the workload container, wherein the sidecar includes:
agent binaries associated with multiple operating systems and including agent hooks, wherein each of the agent binaries is associated with one or more target operating systems of the multiple operating systems; and
a guard loader executable on all of the multiple operating systems and including an operating system identifier configured to identify an operating system of the workload container;
loading the guard loader into the shared volume using the sidecar;
copying the agent binaries into the shared volume as an agent binary library using the sidecar;
executing the guard loader using the node to identify the operating system of the workload container and to activate in the shared volume the agent binary associated with the identified operating system of the workload container from the agent binary library in the shared volume;
binding loader hooks to the activated agent binary using the activated agent binary, such that the workload container requesting a process associated with one of the loader hooks results in a call to the activated agent binary for the requested process;
executing operations of the workload container using the node, such that the activated agent binary receives the call from the workload container and the received call includes the requested process;
upon receiving the call including the requested process, using the node to execute the activated agent binary by:
comparing the requested process to a policy to determine if the requested process is approved or denied;
when the requested process is approved, passing the requested process to one of the agent hooks identified by the activated agent binary as being associated with the requested process; and
when the requested process is denied, not passing the requested process to one of the agent hooks.

12. The method of claim 11, wherein the policy includes whitelisted processes, such that any requested process identified by the policy as a whitelisted process is approved by the activated agent binary.

13. The method of claim 12, further comprising the activated agent binary denying the requested process when the requested process is not identified as a whitelisted process.

14. The method of claim 11, wherein the policy includes blacklisted processes, such that any requested process identified by the policy as a blacklisted process is denied by the activated agent binary.

15. The method of claim 14, further comprising the activated agent binary approving the requested process when the requested process is not identified as a blacklisted process.

16. The method of claim 11, further comprising the backend system providing the policy to the activated agent binary.

17. The method of claim 16, further comprising:
during a learning stage, the activated agent binary approving and notifying the backend system of all loader hooks requested by the workload container; and
at the end of the learning stage, the backend system generating the policy based on the loader hooks requested by the workload container during the learning stage.

18. The method of claim 16, further comprising:
the activated agent binary sending to the backend system request summaries comprising the loader hooks requested by the workload container; and
the backend system modifying the policy based on the request summaries.

19. The method of claim 11, wherein the guard loader identifies the operating system of the workload container based on a presence or lack of files accessible by the guard loader.

20. The method of claim 11, further comprising the backend system modifying the task, such that the sidecar is a first container executed in an initialization flow of the task.

* * * * *